United States Patent
Oizumi

(10) Patent No.: US 9,854,198 B2
(45) Date of Patent: Dec. 26, 2017

(54) MEMORY CARD DEVICE

(75) Inventor: Hiroshi Oizumi, Tokyo (JP)

(73) Assignee: Freebit Co. Ltd., Tokyo (JP)

( * ) Notice: Subject to any disclaimer, the term of this patent is extended or adjusted under 35 U.S.C. 154(b) by 380 days.

(21) Appl. No.: 13/976,890

(22) PCT Filed: Jan. 5, 2012

(86) PCT No.: PCT/JP2012/050104
§ 371 (c)(1),
(2), (4) Date: Sep. 13, 2013

(87) PCT Pub. No.: WO2012/093696
PCT Pub. Date: Jul. 12, 2012

(65) Prior Publication Data
US 2014/0016003 A1    Jan. 16, 2014

Related U.S. Application Data

(60) Provisional application No. 61/430,127, filed on Jan. 5, 2011.

(51) Int. Cl.
*H04N 5/76* (2006.01)
*H04L 29/08* (2006.01)
(Continued)

(52) U.S. Cl.
CPC ............. *H04N 5/76* (2013.01); *H04L 67/141* (2013.01); *H04W 12/02* (2013.01);
(Continued)

(58) Field of Classification Search
CPC ................................ H04N 5/76; H04L 67/141
(Continued)

(56) References Cited

U.S. PATENT DOCUMENTS 8,543,706 B2 * 9/2013 Niisato et al. ................ 709/227
2005/0033848 A1  2/2005 Croome
(Continued)

FOREIGN PATENT DOCUMENTS

JP  2005-100103 A  4/2005
JP  2009-159587 A  7/2009
(Continued)

OTHER PUBLICATIONS

EP Search Report, Application No. 12732486.1, dated May 26, 2017, 12 pages.

*Primary Examiner* — Antoinette Spinks
(74) *Attorney, Agent, or Firm* — Haynes and Boone, LLP

(57) ABSTRACT

Provided is a method capable of performing bi-directional communication by only a memory card device and without depending on the environment of the connecting device and the like. This memory card device has a housing in which a wireless communication module and memory module are mounted, and in the this memory module are provided a system area that cannot be access by a digital device in which the memory card device is mounted, and a user area that can be accessed by the digital device; wherein an operation system (OS), a file server program that operates together with the operation system to control data that is stored in the user area, and a communication module that connects the server program to a virtual network by way of a relay server on the Internet, and makes it possible to control the data that is stored in the user area from the Internet side by way of the server program are installed in the system area.

9 Claims, 6 Drawing Sheets

(51) Int. Cl.
*H04W 12/02* (2009.01)
*H04L 29/06* (2006.01)

(52) U.S. Cl.
CPC .............. *G06F 2213/3804* (2013.01); *G06F 2213/3814* (2013.01); *H04L 63/0272* (2013.01)

(58) Field of Classification Search
USPC ........................................ 348/231.9; 709/250
See application file for complete search history.

(56) References Cited

U.S. PATENT DOCUMENTS

| | | | |
|---|---|---|---|
| 2006/0004946 A1* | 1/2006 | Shah | G06F 13/28 711/100 |
| 2006/0190529 A1 | 8/2006 | Morozumi et al. | |
| 2006/0208066 A1 | 9/2006 | Finn et al. | |
| 2009/0024779 A1* | 1/2009 | Chan | G06F 1/187 710/304 |
| 2009/0259836 A1* | 10/2009 | Chan | G06F 9/4406 713/2 |
| 2010/0201845 A1* | 8/2010 | Feinberg | G06F 9/445 348/231.99 |
| 2010/0257226 A1* | 10/2010 | Niisato et al. | 709/203 |

FOREIGN PATENT DOCUMENTS

| | | |
|---|---|---|
| WO | 2005/003980 A1 | 1/2005 |
| WO | WO 2006/071821 A2 | 7/2006 |
| WO | 2007/035275 A2 | 3/2007 |
| WO | WO 2009/093308 A1 | 7/2009 |

* cited by examiner

MEMORY CARD DEVICE

CROSS REFERENCE TO RELATED APPLICATIONS

This application is a United States national phase of co-pending international patent application No. PCT/JP2012/050104, filed Jan. 5, 2012, which claims benefit of U.S. provisional application No. 61/430,127, filed Jan. 5, 2011, the disclosures of which are incorporated herein by reference.

FIELD OF THE INVENTION

The present invention relates to a memory card device.

BACKGROUND OF THE INVENTION

Memory card devices having a wireless LAN communication function are known (for example, refer to Patent Reference WO/2007/035275). With this kind of memory card device, when attached to a device that does not support a network connection such as a digital still camera and the like, communication is performed wirelessly with a network without the use of a personal computer. For example, it is possible to automatically upload files to a cloud service on the Internet.

Incidentally, current wireless LAN compatible memory card devices only upload files to a preset server, and a user that wants to use a file on a network is only able to use files that have been transferred to that server and is not able to directly access files that are stored in the memory card device.

Taking into consideration the situation described above, the object of the present invention is to provide a memory card device that has a communication module that is capable of performing bi-directional communication by just the memory card device alone without relying on an environment of connected equipment.

SUMMARY OF THE INVENTION

In order to achieve the above object, according to a principal aspect of the present invention, there is provided a memory card device removably mounted in a digital device and used as an add-on external memory of the digital device, comprising:
 a housing; the housing having
  a communication and power-supply interface capable of communicating with the digital device and connected so as to be able to supply power to the memory card device from the digital device;
  an arithmetic unit connected to the communication and power-supply interface through a communication bus; and
  a wireless communication module and a memory that are connected to the arithmetic unit;
   the memory having:
    a system area inaccessible by the digital device in which the memory card device is mounted; and
    a user area accessible by the digital device;
     the system area having installed thereon:
      an operation system (OS) having a local communication protocol stack which performs communication by connecting the memory card device to a wireless communication network by way of the wireless communication module;
      an application program that operates together with the operation system to control data stored in the user area; and
      a communication module for connecting the application program with a virtual network through a relay server on the Internet; and
     wherein the communication module
      interposes between the application program and the local communication protocol stacks of the operation system, stores an address on the virtual network for the application program, and, by performing tunneling processing, transmits packets destined to the virtual network from the application program to the relay server via the local communication stacks;
      has protocol stacks that are independent of the local communication protocol stacks and that are necessary for the application program for performing communication via the virtual network; and
      stores a global address of the relay server on the Internet, and based on the global address of the relay server, establishes a tunneling connection between the communication module and the relay server; and
     wherein the application program is a server program for transmitting data stored in the user area or receives data to be stored in the user area via the virtual network, by connecting to the virtual network via the relay server on the Internet.

Preferably, according to one embodiment of the present application, the communication module captures a request packet from the server program, encapsulates the packet with a virtual network address for the server program as a transmission source address, and transmits the packet to the relay server by way of the tunneling connection; and decapsulates packets addressed to the communication module received via the local communication protocol stack, and passes the decapsulated packet to the server program.

According to another embodiment, preferably, the communication module connects to a tunnel-broker server that is provided on the Internet, and receives a global address for the relay server from this broker server.

According to yet another embodiment, preferably the communication module receives and stores an IP address for the server program on the virtual network from the relay server on the Internet. Moreover, the communication module can receive and store a MAC address and IP address for connecting to the virtual network for the server program from the relay server on the Internet. Furthermore, it is desired that the communication module is provided as a library program that can be called by the server program.

According to yet another embodiment, the communication module has an initialization section configured to generate all of Layer 2, 3 and 4 protocol stacks when establishing a Layer 2 connection with the relay server, and generate only Layer 3 and 4 protocol stacks, but not Layer 2 protocol stack when establishing a Layer 3 connection with the relay server.

Moreover, preferably, the server program is provided with an instruction for calling and incorporating the communication module as a communication interface, wherein the server program is configured to have an IP address independent of the computer, and the IP address is received from the relay server and is set for the server program by the communication module.

Furthermore, it is preferred that the server program has a power consumption management unit for actively managing a power consumption of a Wi-Fi module, and making operation at low power consumption possible.

Other characteristics and remarkable effects of this invention can be understood by one skilled in the art by referencing the preferred embodiments for embodying the invention, and the accompanying drawings.

DETAILED DESCRIPTION OF THE INVENTION

In the following, an embodiment of the present invention will be explained with reference to the accompanying drawings.

Figure 1:
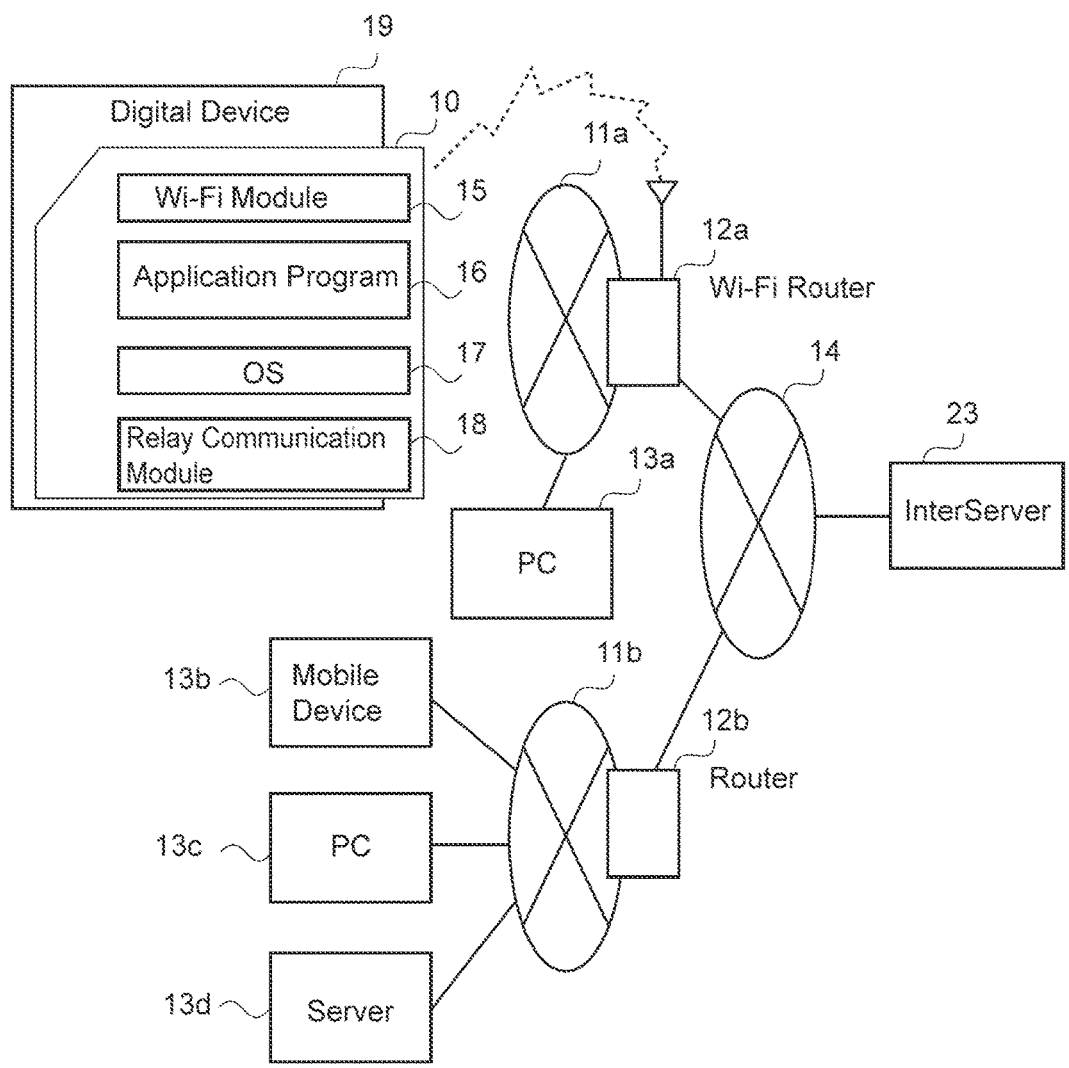
FIG. 1 is a drawing illustrating the overall structure of an embodiment of the present invention.

FIG. 1 illustrates an example of network configuration in which the memory card device 10 of this embodiment is used.

In FIG. 1, 11a and 11b are local networks (LAN) that perform communication using IPv4 or IPv6 protocol. Of these, the router of the local network 11a is a wireless router 12a (Wi-Fi router), and as illustrated by 13a to 13d, the local networks 11a, 11b include home-use personal computers and other devices (for example, mobile personal computers) that have or do not have a wireless communication function. The devices in these local networks 11a, 11b are connected to the Internet 14 by way of the wireless router 12a or wired router 12b, and a communication carrier/ISP (not illustrated in the figure). On the Internet 14, communication is performed using IPv4 protocol. Moreover, an InterServer 23 that serves the role of a hub/router that extends over plural networks 11a, 11b when accessing the memory card device 10 is connected to the Internet 14.

The memory card device 10 of this embodiment has a housing, and is a SD card in which a Wi-Fi communication module 15 for performing communication with the wireless router 12a, an application program 16 that functions as a file server program, an operating system (OS) 17 for the application program 16, and a relay communication module 18 for establishing a tunneling connection with the InterServer 23 are installed; and when mounted in digital equipment 19 (for example, a digital camera or PC), functions as one device on the local network 11a independent of that digital device 19.

Figure 2:
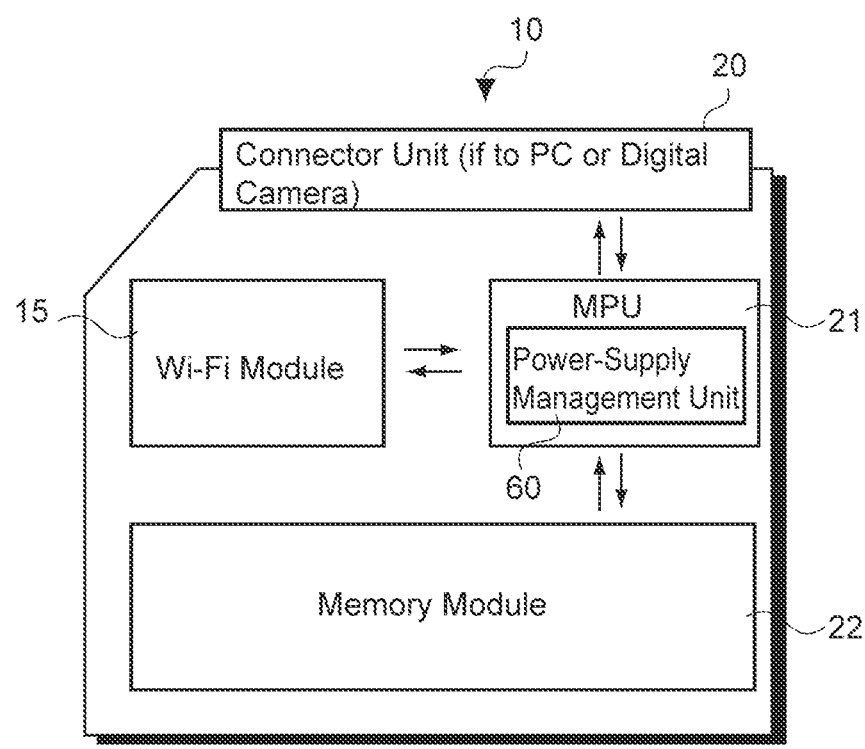
FIG. 2 is a drawing illustrating the physical structure of a memory card device of an embodiment of the present invention.
Figure 3:
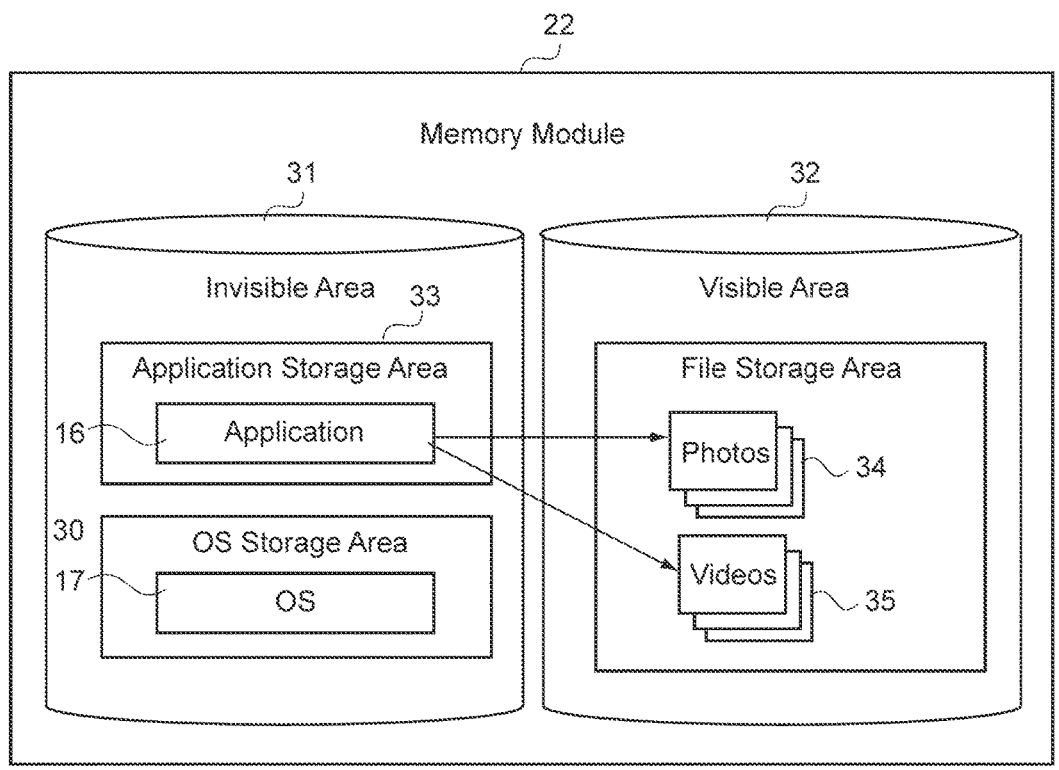
FIG. 3 is a drawing illustrating the structure of a memory module inside the memory card of an embodiment of the present invention.

As illustrated in FIG. 2, the physical construction of the memory card device 10 has a communication and power-supply interface 20 that is a connecting interface with the digital device 19, a Wi-Fi communication module 15 for connecting with the Wi-Fi router 12a, an MPU 21 (arithmetic unit) that has a work memory, various CPUs and various controllers mounted on one chip, and a 8 GByte to 32 GByte capacity memory module 22. These components are connected together by a communication bus. Moreover, as illustrated in FIG. 3, the memory module 22 is logically divided into an invisible area 31 (system area) that is for system use only and that cannot be recognized by the digital device 19, and a visible area 32 (user area) that can be used and that can be recognized by the digital device 19.

An OS (Operating System) storage area 30 that stores the OS illustrated in FIG. 1, and an application storage area 33 for storing a relay communication module 18 that functions as the communication module of the present invention and an application program 16 (server program) are provided in the invisible area 31.

Moreover, files that are processed by the digital device 19, for example, photographs 34 or video files 35, are stored in the visible area 32.

On the other hand, as illustrated in FIG. 1, the InterServer 23 (a "relay server" in this invention) that controls communication with the memory card device 10 is connected to the Internet 14. This InterServer 23, as will be explained in detail later, has the function of mediating the connections between the application program 16 that is installed in the memory card device 10 and all of the PCs 13a, 13c and other devices 13b, 13d on the Internet 14 or local network 11a, 11b.

Here, it is intended that at least the memory card device 10 (relay communication module 18) and InterServer 23 are provided or produced by the same manufacturer or under a unified standard, and are designed to interface with each other. As described below, the InterServer 23 provides the relay communication module 18 with a virtual private/global address in IPv4 protocol for the application program 16 to enable communication using a TCP/IP session with tunneling connection established on the InterServer 23 regardless of its carrier and ISP.

A feature of the present invention is connecting a virtual network (or actual network) with the memory card device 10 without going through the digital device 19. More specifically, the application program 16 that is installed in the memory card device 10 (when there are plural application programs 16, a relay communication module 18 is provided for each program 16) can retain an IPv4 or IPv6 address and a MAC address on the virtual network (or real network). An embodiment of a structure and its operations enabling the above will be discussed below.

Figure 4:
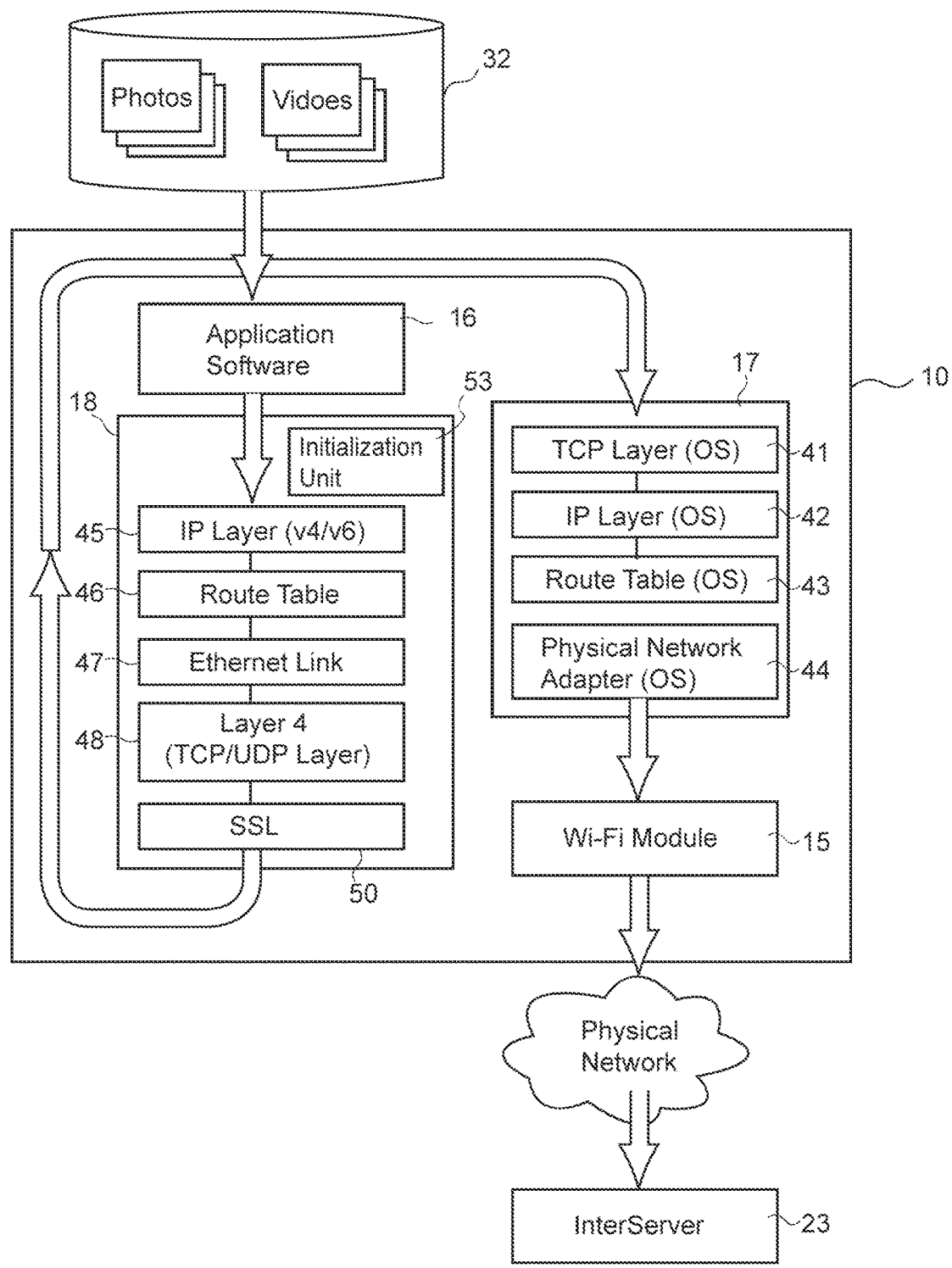
FIG. 4 is a schematic diagram illustrating the logical processing system in the memory card device of an embodiment of the present invention.

FIG. 4 is a functional block diagram illustrating the OS 17, the relay communication module 18, the application 16 and the Wi-Fi module 15 that are installed in the memory card device 10. In this explanation, only the features of the present invention will be illustrated in the drawings and explained, with the other structure that is naturally provided being omitted from the drawings and explanation.

In FIG. 4, the portion for the OS 17 illustrates the local communication protocol stack group that is included in a kernel, and is shown in a state that hierarchically has a physical network adapter (layers 1 and 2) 44 that controls a network card, a route table 43, an IP layer (layer 3) 42, and a TCP layer (layer 4) 41.

On the other hand, the relay communication module 18, by having the protocol stacks layer 2 (Ethernet (registered trademark) Link) 47, route table 46, layer 3 (IP layer (IPv4/IPv6)) 45, and layer 4 (TCP/UDP layer) 48 that are in a form that conforms to RFC and that are independent of the OS 17, makes it possible to create an application program 16 that does not depend on a special network environment. This relay communication module 18 also has a tunneling application 49 that is not shown in figure. The function of this tunneling application will be explained in detail later, however, this tunneling application transmits packets received from the Ethernet (registered trademark) link layer 45 to the InterServer 23 via a tunneling connection after performing a processing that prevents congestion due to a TCP-Over-TCP problem and prevents a decrease in the communication bandwidth to the packets. In FIG. 4, an SSL 50 is illustrated; however, construction without this SSL 50 is also possible.

The software group that forms the relay communication module 18 is provided as a library that can be read out as required by the application program 16, and is used as a communication interface of this application program 16. By proving the software as a library in this way, it is possible to minimize modifications to each application program 16.

Figure 5:
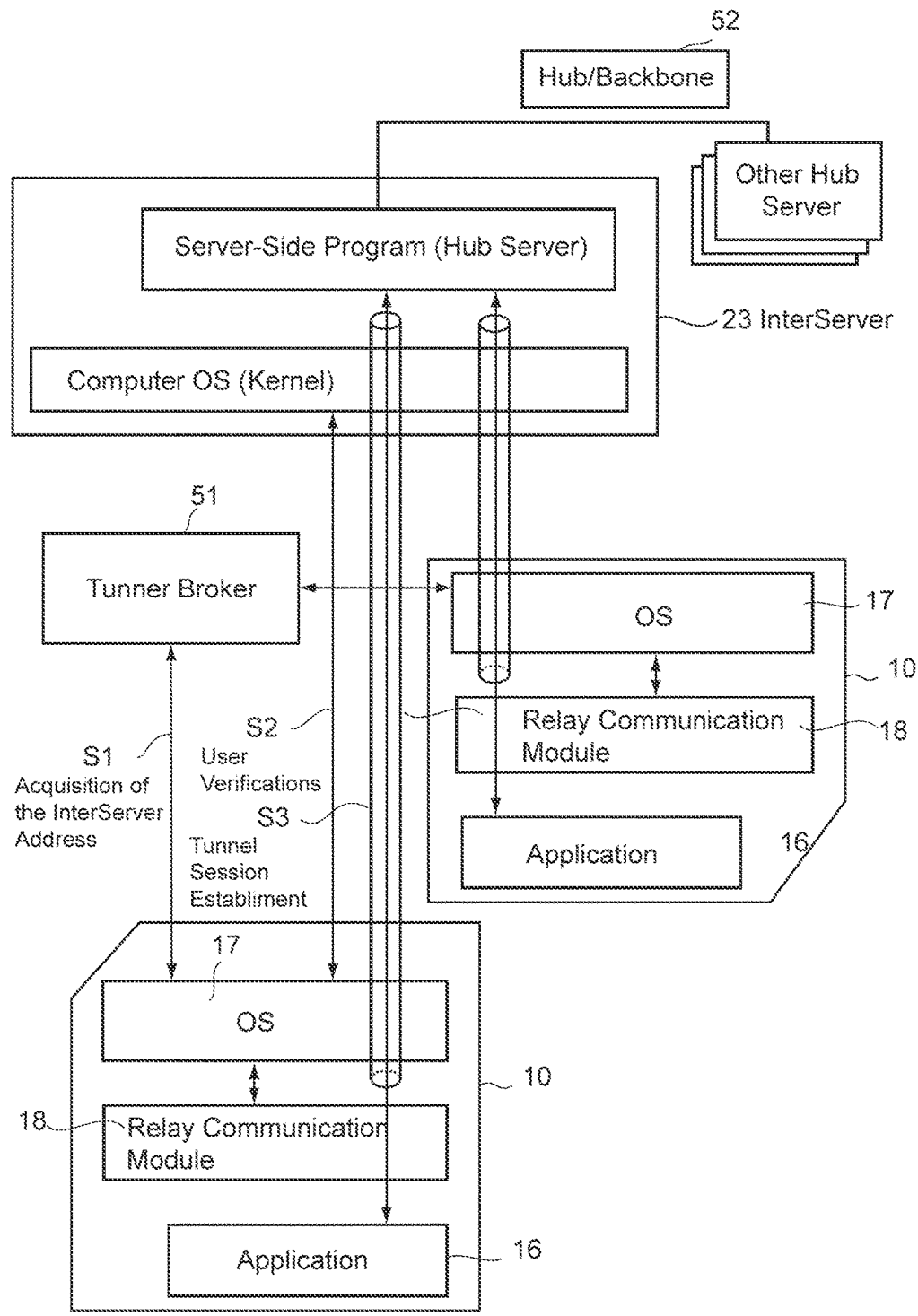
FIG. 5 is a schematic diagram illustrating the logical communication processing system between the memory card device and an InterServer on the Internet according to one embodiment of the present invention.

Next, the operation of this communication module 18 will be explained with reference to FIG. 4 and FIG. 5.

A system is constructed such that when the digital device 19 is activated with the memory card device 10 inserted into the digital device 19 and power is supplied to the memory card device 10, the memory card device 10 activates the OS 17. The OS 17 is deployed in the internal memory of the MPU 21 (FIG. 2), and activated on a RAMDISK. After the RAMDISK is built by this activation process, the library that is required by the OS 17 is deployed on the RAMDISK, and the startup sequence of the application 16 is started.

On the other hand, the Wi-Fi module 15 is also activated, and when the memory card device 10 is inside a wireless network area, the Wi-Fi module 15 is automatically connected with the wireless router 12a, and acquires the IP address of the local network 11a.

After the application program 16 has started, the relay communication module 18 is read to the memory of the MPU 21 by a command from the application program 16. As a result, the relay communication module 18, as illustrated in step S1 in FIG. 5, first connects to a tunnel broker 51 on the Internet by way of the Wi-Fi module 102 and router. This tunnel broker 51 selects from an address database (not illustrated in the figure) a InterServer 23 at the destination where the tunnel connection is established (the application 16 has the Web address of the broker 51 or the InterServer 23), and notifies the relay communication module 18 of the IPv4 address of this InterServer 23. By doing so, the relay communication module 18 is able to identify the InterServer 23, and after performing user authentication (step S2), the relay communication module 18 is able to establish a tunneling session and perform communication using the MAC address and IP address for the application that are received from the InterServer 23 (step S3).

In other words, after the application 16 is started and the relay communication module 18 is connected to the InterServer 23, authentication is performed for establishing a connection, and then based on this, a MAC address and IP address for a virtual private network for the application program 17 are assigned to the communication module 18 from the InterServer 23 (the MAC address and IP address can also be assigned from the tunnel broker 51, and can also be set and stored in the memory card device 10 at the time of shipment of the memory card device 10). The MAC address and IP address are saved by the relay communication module 18 in the memory of the MPU 21 as data.

In one embodiment, a program on the InterServer 23 side, when seen from the application program 16, is seen as a hub (HUB) on a virtual network. In other words, the InterServer 23 is constructed as a hub assigned to each group, and in the present invention, this assignment is called grouping. When there are plural InterServers 23, it is feasible that the application programs 16 or other client terminals 13a to 13d that are to belong to the same virtual private network are each connected to a different InterServer 23, however, in that case, connections are routed preferably by a hub/backbone server 52 that collectively manages the plural InterServers 23 or plural server programs (hub servers). In the following, this kind of connection is called a HUB connection (or "layer 2 connection").

In contrast to the layer 2 connection above, the relay communication module 18 is constructed so as to also be able to make a PPP connection (or "layer 3 connection") with an InterServer 23. Switching between a layer 2 connection and a layer 3 connection is executed by an initialization unit 53 illustrated in FIG. 4. This initialization unit 53 executes an initialization process based on an argument received from the application program 16 that indicates a layer 2 connection or a layer 3 connection. In this initialization process, for example, a specified tunnel broker 51 and InterServer 23 are selected according to this argument, and a connection is established. Moreover, when according to the argument, a layer 2 connection is indicated, the initialization unit 53 operates so as to create all of the layer 2, 3, 4 protocol stacks, and when a layer 3 connection is indicated, the initialization unit 53 operates so as to create the layer 3 and layer 4 protocol stacks and not create the layer 2 protocol stack.

In other words, with the present invention, it is possible to connect the memory card device 10 directly to a virtual network by way of a server (InterServer 23) on the Internet. This memory card device 10 has a relay communication module 18, and this relay communication module 18 is located between the application program 16 and the local communication protocol stack group (41 to 44) of the OS 17 that is installed in this computer, has an address on a virtual network for the application program 16, and performs the tunneling processing on packets from the application program 16 to the virtual network to thereby pass the processed packets to the InterServer 23 by way of the local communication protocol stack (41 to 44). The relay communication module 18 also has layer 2, 3, 4 protocol stacks (45 to 48) that are independent of the local communication protocol stack group (41 to 44) and are necessary for the application program 16 to communicate by way of the virtual network.

According to such a structure, because the relay communication module 18 has layer 2, 3, 4 protocol stacks that are independent of the local communication protocol stack group (41 to 44) of the OS 17, communication is possible without depending on a specific network environment of a digital device 19 and OS 17. In other words, even on an OS without a particular protocol stack installed, application software using that particular protocol may be executed. For example, even under an OS environment in which there is no IPv6 protocol, it is possible to create an application that uses IPv6 protocol at each application basis.

In other words, the application 16 itself is integrated with the relay communication module 18 of this embodiment, and that makes it possible to function as an independent single device that has a unique IP address of itself.

In this embodiment, this application 16 is a fileserver program for performing file operations, and provides an Http or Ftp interface for providing files such as photographs 34, music, and videos 35 that are stored in the visible area 32, to the outside.

According to such a structure, for example, in FIG. 1, the user of a PC 13c that is connected to a different local network 11b can use the virtual IP address that is assigned to the application 16 (relay communication module 18)

above, and by pushing can connect to the application 16 (fileserver program) by way of the InterServer 23, and by way of an interface that is provided by this application, can perform operation on files 34, 35 that are stored in the memory card device 10.

With construction such as described above, even when a PC 13*a* on the same local network 11*a* accesses the memory card device 10, that PC 13*a* must go though the InterServer 23 on the Internet. In other words, routing to the memory card device 10 must all be performed by the InterServer 23.

As illustrated in FIG. 2, this memory card device 10 has a power-supply management unit 60. This power-supply management unit 60 actively manages the power consumed by the Wi-Fi module 15 according to the operation of the application 16, and makes operation with low power consumption possible.

The present invention is not limited to the embodiments described above and various modifications are possible within a range that does not change the gist of the invention.

For example, in the embodiments described above, the application program 16 was a browser, Internet telephone program and proxy program, however, the application program 16 is not limited to these, and the present invention can be applied to any application program that requires bidirectional communication.

Moreover, in the embodiment described above, the tunnel broker 51 selects the InterServer 23; however, the InterServer 23 can be set in advance for each relay communication module.

The communication module of this embodiment operates 100% in the user mode (normally, programs such as a driver operates in a kernel mode), so for an OS that is capable of creating a TCP/IP application, transplantation is very simple, and the communication module can also be applied to OSs other than that explained in the embodiment above, for example, the communication module can be applied to a unique OS that is used in-house by an electronics manufacturer, or to an OS that is used in business equipment such as cash registers and the like.

Figure 6:
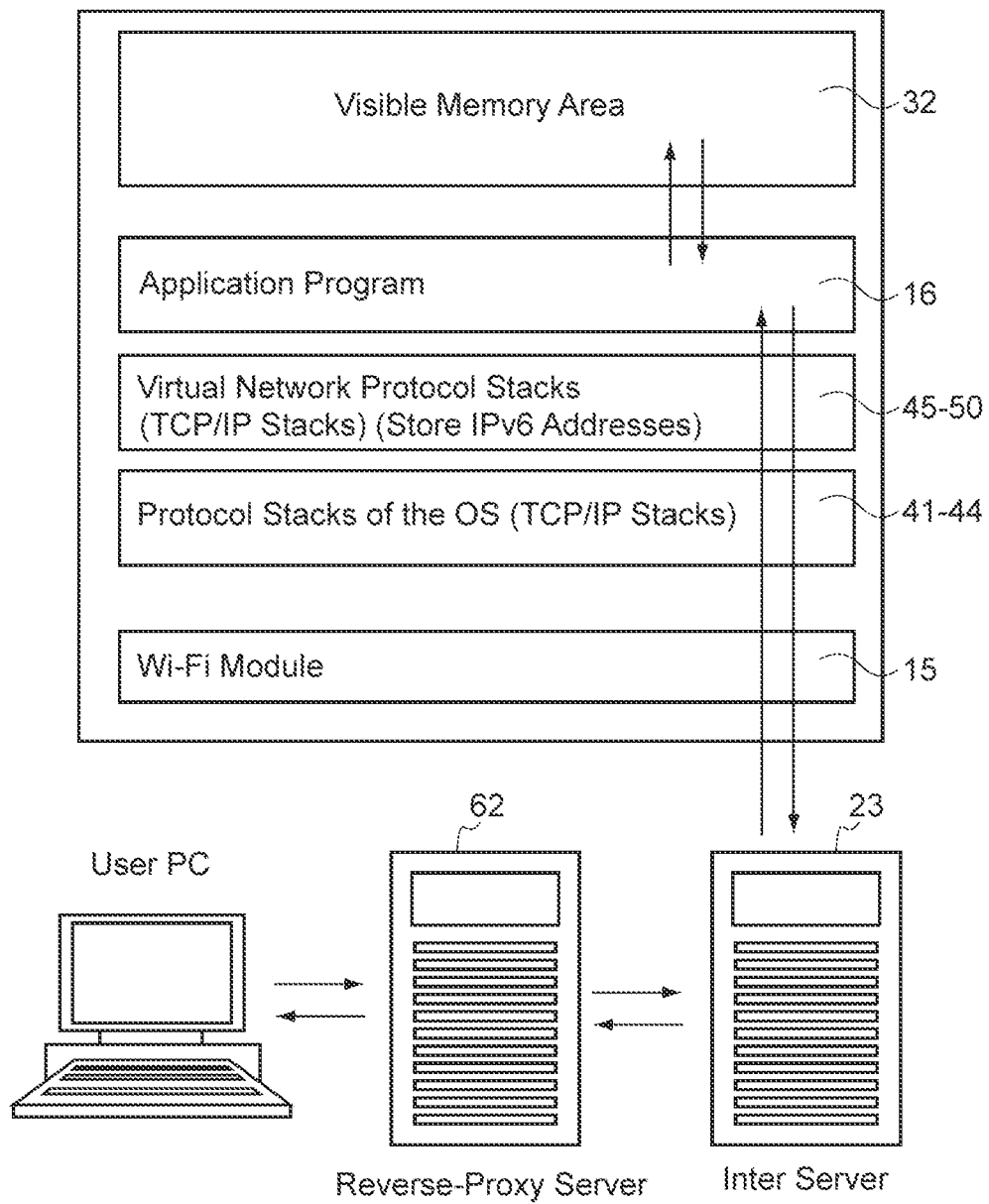
FIG. 6 is a drawing illustrating the communication processing system of another embodiment of the present invention.

Furthermore, in the embodiment described above, as illustrated in FIG. 4, an example is given in which the InterServer terminates the tunneling connection from the user, however, when it is not possible to use a tunneling connection or an IPv6 connection from the user's terminal (PC or the like), then, as illustrated in FIG. 6, it is also possible to provide a reverse proxy server 62 on the user's local area network or on the Internet for connecting the user's PC to a virtual network that comprises the InterServer 23.

Moreover, taking advantage of the fact that this memory card device is compact, the memory card device can be mounted in various kinds of digital devices. For example, the memory card device can be mounted in an automobile battery, and used for monitoring the remaining charge of the battery.

What is claimed is:

1. A memory card device removably inserted in a digital device and used as an add-on external memory of said digital device when inserted, said memory card capable of independent wireless communication without relying on said digital device's network communication function, comprising:
   a housing insertable to said digital device; said housing having a communication and power-supply interface capable of communicating with said digital device and connected so as to be able to supply power to said memory card device from said digital device;
   a microprocessor unit connected to the communication and power-supply interface through a communication bus;
   a wireless communication circuit capable of transmitting and receiving a wireless signal; and
   a memory that is connected to the microprocessor unit; said memory having:
      a system area inaccessible by said digital device in which said memory card device is inserted; and
      a user area accessible by said digital device; said system area having installed thereon:
         an operating system (OS) having a local communication protocol stack which performs communication by connecting said memory card device to a wireless communication network via the wireless communication circuit;
         an application program that operates together with the operating system to control data stored in said user area; and
         a communication program for connecting said application program with a virtual network through a relay server on the Internet; and
      wherein said communication program interposes between said application program and the local communication protocol stack of the operating system, stores an address on said virtual network for said application program, and, by performing tunneling processing, transmits packets destined to said virtual network from said application program to said relay server via the local communication stacks;
      has protocol stacks that are independent of the local communication protocol stack and that are necessary for said application program for performing communication via said virtual network; and
      stores a global IP address of said relay server on the Internet, and based on the global IP address of said relay server, establishes a tunneling connection between said communication program and said relay server;
   wherein said application program further comprises a server program that provides a File Transfer Protocol (FTP) interface or a Hypertext Transfer Protocol (HTTP) interface to a user over the Internet through said relay server to enable read and write access to the user area of the memory by the user;
   wherein when the memory card is inserted in the digital device and the power is supplied to the memory card, a RAMDISK is built in the microprocessor unit, the operating system is deployed on the RAMDISK, the application program is executed, the wireless communication circuit and the communication program are activated so as to connect the wireless communication network, and the tunneling connection to the relay server is established by connecting the virtual network using the global IP address stored in the communication program.

2. The memory card device according to claim 1, wherein said communication program captures a request packet from the server program, encapsulates said packet with a virtual network address for the server program as a transmission source address, and transmits the packet to said relay server by way of the tunneling connection; and
   decapsulates packets addressed to said communication program received via the local communication protocol stack, and passes the decapsulated packet to the server program.

3. The memory card device according to claim 1, wherein said communication program connects to a tunnel-broker server that is provided on the Internet, and receives a global address for the relay server from this broker server.

4. The memory card device according to claim 1, wherein said communication program receives and stores an IP address for the server program on said virtual network from said relay server on the Internet.

5. The memory card device according to claim 1, wherein said communication program can receive and store a MAC address and IP address for connecting to said virtual network for the server program from said relay server on the Internet.

6. The memory card device according to claim 1, wherein said communication program is provided as a library program that can be called by the server program.

7. The memory card device according to claim 1, wherein said communication program has an initialization section configured to generate all of Layer 2, 3 and 4 protocol stacks when establishing a Layer 2 connection with said relay server, and generate only Layer 3 and 4 protocol stacks, but not Layer 2 protocol stack when establishing a Layer 3 connection with said relay server.

8. The memory card device according to claim 1, wherein the server program is provided with an instruction for calling and incorporating said communication program as a communication interface, wherein the server program is configured to have an IP address independent of the computer, and the IP address is received from the relay server and is set for the server program by said communication program.

9. The memory card device according to claim 1, wherein the server program has a power consumption management unit for actively managing a power consumption of a Wi-Fi module, and making operation at low power consumption possible.

* * * * *